(12) United States Patent
Knoop et al.

(10) Patent No.: US 6,940,448 B2
(45) Date of Patent: Sep. 6, 2005

(54) METHOD AND DEVICE FOR ASCERTAINING THE IMMINENCE OF AN UNAVOIDABLE COLLISION

(75) Inventors: Michael Knoop, Ludwigsburg (DE); Martin Heinebrodt, Stuttgart (DE); Joachim Thiele, Tamm (DE); Martin Staempfle, Ulm (DE); Fred Oechsle, Ludwigsburg (DE); Ulf Wilhelm, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 10/634,282

(22) Filed: Aug. 4, 2003

(65) Prior Publication Data

US 2004/0093160 A1 May 13, 2004

(30) Foreign Application Priority Data

Aug. 2, 2002 (DE) ......................................... 102 35 414

(51) Int. Cl.[7] ............................................. G01S 13/93
(52) U.S. Cl. .............................. 342/70; 342/71; 342/72; 342/106; 342/114; 342/115; 340/435; 340/436; 340/903; 701/301; 701/45
(58) Field of Search ............................. 342/70–72, 106, 342/114, 115; 340/435, 436, 903; 701/45, 70, 72, 78, 96, 301

(56) References Cited

U.S. PATENT DOCUMENTS

| 5,321,407 A | * | 6/1994 | Kikuchi et al. ............... 342/70 |
| 5,467,072 A | | 11/1995 | Michael ...................... 340/436 |
| 5,473,538 A | * | 12/1995 | Fujita et al. .................. 701/45 |
| 5,684,473 A | | 11/1997 | Hibino et al. ................ 340/903 |
| 6,508,102 B1 | * | 1/2003 | Margolis et al. .................. 73/8 |
| 6,675,094 B2 | * | 1/2004 | Russell et al. ............... 701/301 |
| 6,735,510 B2 | * | 5/2004 | Hac .............................. 701/70 |
| 6,803,673 B2 | * | 10/2004 | Otterbach et al. ............ 307/9.1 |
| 6,812,831 B2 | * | 11/2004 | Ikeda .......................... 340/435 |
| 6,828,903 B2 | * | 12/2004 | Watanabe et al. ........... 340/435 |
| 6,831,572 B2 | * | 12/2004 | Strumolo et al. ............ 340/903 |
| 6,836,716 B2 | * | 12/2004 | Roelleke et al. .............. 701/45 |
| 2002/0036584 A1 | | 3/2002 | Jocoy et al. ................... 342/70 |
| 2003/0139881 A1 | * | 7/2003 | Miller et al. ................. 701/301 |
| 2004/0088097 A1 | * | 5/2004 | Fujinami et al. .............. 701/70 |
| 2004/0098197 A1 | * | 5/2004 | Matsumoto et al. ......... 701/301 |

FOREIGN PATENT DOCUMENTS

| DE | 197 22 947 | 2/1999 |
| WO | WO 01/94970 | 12/2001 |

OTHER PUBLICATIONS

"Performance analysis of acceleration resolution for the LFMCW radar", Yuming Du; Shuli Miao; Jianyu Yang; Jintao Xiong;Communications, Circuits and Systems, 2004. ICCCAS 2004. 2004 International Conference on, vol.: 2, 27–29 June 200 Ps:887–890.*

"An ANFIS controller for the car–following collision prevention system", Mar, J.; Feng–Jie Lin;Vehicular Technology, IEEE Transactions on, vol.:50, Issue:4, Jul. 2001 pp.:1106–1113.*

* cited by examiner

Primary Examiner—John B. Sotomayor
(74) Attorney, Agent, or Firm—Kenyon & Kenyon

(57) ABSTRACT

A method and a device for ascertaining the imminence of an unavoidable collision of a vehicle with an object, all locations within a determinable prediction time interval being predetermined as a function of the maximum possible longitudinal acceleration and lateral acceleration of the vehicle and of the at least one object. The imminence of an unavoidable collision between the vehicle and the object may be recognized, also taking into account the extension of the vehicle and of the at least one object.

12 Claims, 3 Drawing Sheets

METHOD AND DEVICE FOR ASCERTAINING THE IMMINENCE OF AN UNAVOIDABLE COLLISION

FIELD OF THE INVENTION

The present invention relates to a method and a device for ascertaining the imminence of an unavoidable collision of a vehicle with an object, all locations within a determinable prediction time interval being predetermined as a function of the maximum possible longitudinal acceleration and lateral acceleration of the vehicle and of the at least one object. The imminence of an unavoidable collision between the vehicle and the object may be detected, also taking into account the extension of the vehicle and of the at least one object.

BACKGROUND INFORMATION

German Patent No. 197 22 947 describes a method and a device for determining a future travel course progression or course range of a vehicle whose traveling speed is controllable as a function of a distance to preceding vehicles, the future course range being determined at least on the basis of a travel-course progression of one preceding vehicle. To that end, a lateral sway is determined with respect to all preceding vehicles detected. According to a further development of the present invention, the determined future course range is limited on the basis of stationary objects detected.

SUMMARY OF THE INVENTION

An object of the present invention is to indicate a method and a device which make it possible to recognize the imminence of an unavoidable collision of a vehicle with at least one object, and to initiate suitable measures as a function of this recognition.

Advantageously, upon recognition of an imminent, unavoidable collision, measures are initiated which warn the driver of the vehicle and/or reduce the severity of the collision and/or decrease the risk of injury to the vehicle occupants and/or influence the vehicle so that the risk of injury to the vehicle occupants is reduced. Meant by this is, in particular, the initiation of an emergency braking which has a deceleration that corresponds approximately to the maximum possible vehicle deceleration, the triggering of restraint systems, particularly seat-belt tensioners and/or airbags, and/or the targeted deceleration of individual vehicle wheels, the vehicle in the imminent unavoidable collision thereby colliding in such a way with the object that the risk of injury to the vehicle occupants is minimized.

Moreover, it is advantageous that, to predetermine the future locations of the vehicle and of the at least one object, at least one of the following variables is evaluated: instantaneous position, instantaneous longitudinal velocity and lateral velocity, orientation directions of the object-and/or of the vehicle, as well as the spatial object extensions. To be understood in this context by the instantaneous position is the position of the at least one object relative to the vehicle, or else also the positions of the vehicle and of the object in connection with the total surroundings situation, which may also include, for example, stationary objects at the edge of the vehicle. The variables—instantaneous position, instantaneous longitudinal velocity and lateral velocity, as well as orientation direction of the vehicle and of the object—may be detected by suitable sensor devices and supplied as input variables for the method of the present invention.

It is particularly advantageous that the instantaneous position, the instantaneous longitudinal velocity and lateral velocity and the orientation direction of the vehicle or of the object, as well as the spatial object extension, particularly in the lateral direction, are ascertained by at least one radar, lidar or video sensor, or a combination thereof.

It is also advantageous that the maximum possible longitudinal acceleration and lateral acceleration of the at least one object or of the objects is assumed as a function of an allocation of the objects to object classes. According to the present invention, the individual object classes may be delimited from each other according to different criteria. In this context, it is particularly advantageous to mention that the objects are allocated to object classes as a function of the detection by different sensor systems. The objects may be allocated to object classes depending upon whether an object may be detected by a radar, lidar, or video sensor, or a combination thereof. The objects are allocated to the object classes as a function of the measurement data from one or more sensors, advantageously on the basis of the object extension measured by lidar and/or radar sensors, or based on the gray-scale-value pattern ascertained by video sensor. For example, a pedestrian is more likely detectable by a video sensor, a radar sensor in this case allowing substantially less reliable detection. Furthermore, it is within the meaning of the present invention that the objects are allocated to object classes as a function of the measured object velocities. Using an object classification of this kind, the detected objects may be classified, for example, as stationary, stopped, slow-moving or fast-moving objects. Based on this allocation, it is also possible to predict an estimation about the future, maximum possible acceleration of the objects, as well as their acceleration directions.

Furthermore, it is advantageous that the time interval for which a prediction is made about the imminence of an unavoidable collision is variable, and is adaptable to the instantaneous traffic situation, which is detected by the surroundings sensor system. Since the method of the present invention precalculates future object trajectories, a high computing expenditure is necessary. It is advantageous if the time interval for the prediction is variable as a function of the number of detected objects as well as their classification, since the computing expenditure may be very different depending on the object number and object classes. A variable prediction time interval also makes it possible to change the accuracy of the prediction within this time interval, which means the method may be adapted at any time to the surroundings situation.

Advantageously, the imminence of an unavoidable collision is determined when, within the prediction time interval, a condition occurs where the precalculated trajectory tube of the vehicle intersects with the precalculated trajectory tube of at least one object, taking into account half the lateral extension of the vehicle and of the object, respectively, and at the same time, no possible precalculated trajectory exists any longer which describes a collision-free movement. Given the presence of such a situation, a collision is unavoidable, and suitable measures are initiated for warning the driver and/or for reducing the severity of the collision and/or the risk of injury to the vehicle occupants.

It is also advantageous that the devices, controllable by the output device, for reducing the severity of the collision and/or the risk of injury to the vehicle occupants include at least one of the following devices: deceleration device, steering device or occupant restraint systems. By triggering at least one of the indicated devices in the event of a determined, imminent, unavoidable collision, it is possible to warn the driver and/or to reduce the severity of the collision and/or to decrease the risk of injury to the vehicle occupants.

Of particular importance is the implementation of the method according to the present invention in the form of a control element provided for a control unit of a motor vehicle. In this context, the control element has stored on it a program that is executable on a computing element, particularly on a microprocessor or Asic, and is suitable for carrying out the method of the present invention. Thus, in this case, the present invention is realized by a program stored on the control element, so that this control element provided with the program constitutes the present invention in the same way as the method, for whose execution the program is suitable. In particular, an electrical storage medium, e.g. a read-only memory, may be used as control element.

Further features, uses and advantages of the present invention come to light from the following description of exemplary embodiments of the present invention which are shown in the figures of the drawing. In this context, all described or depicted features, alone or in any combination, form the subject matter of the present invention.

DETAILED DESCRIPTION

Figure 1:
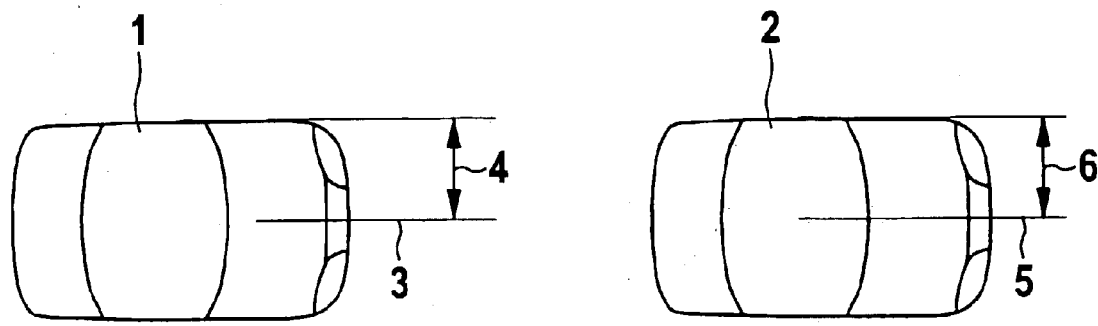
FIG. 1 shows a depiction of the vehicle and of the at least one object, as well as the determination of the lateral extension of the vehicle and of the object.

FIG. 1 shows how the lateral extension of the vehicle or of the object is determined. One sees vehicle 1, which is equipped with the method of the present invention, as well as the at least one object 2 which, in this case, was represented by way of example as a further vehicle. However, this at least one object 2 may also be any further movable or stationary object conceivable in traffic. Also drawn in is vehicle longitudinal axis 3, which forms the center axis of the vehicle in the longitudinal direction. In this case, vehicle lateral extension 4 is half the vehicle width, and is bounded by vehicle longitudinal axis 3 and the outermost lateral boundary of the vehicle. Half of object lateral extension 6 is determined analogously to the determination of half of vehicle lateral extension 4. This half of object lateral extension 6 is bounded by longitudinal axis 5, which is oriented in the movement direction of object 2, as well as the outermost lateral object boundary. The consideration of half the vehicle lateral extension and half the object lateral extension is particularly important for determining the imminence of an unavoidable collision. In the event that the orientation direction of the object, for example, in the form of the vehicle longitudinal axis, is not taken into account or cannot be determined, a circle is assumed having the radius of half the object lateral extension. In considering the orientation direction of the object, for example, in the form of the vehicle longitudinal axis, it is possible to take into account the actual object geometry which is detectable by the surroundings sensor system. The size may be detected and determined by suitable sensors, or, if this should not be possible, it is also conceivable that the size of half the object lateral extension is presumed as the standard assumption as a function of the recognized object class.

Figure 2:
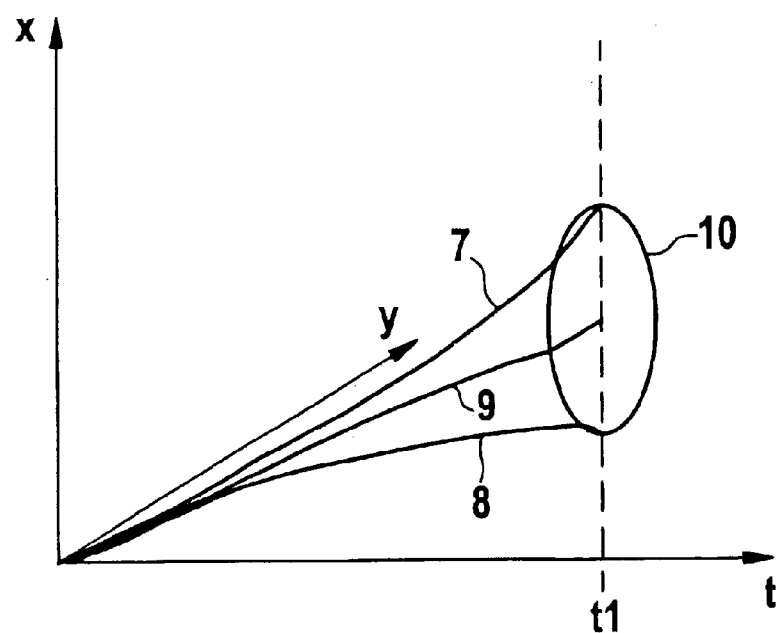
FIG. 2 shows the ascertainment of the trajectory tube over time.

FIG. 2 shows the determination of the trajectory tube over time. To that end, a space-time diagram was selected in which t represents the time axis, and axes x and y represent a spatial orthogonal system in the longitudinal direction and transverse direction of the vehicle. If one considers the instantaneously maximum possible acceleration the vehicle is able to attain in future, then one obtains a curve 7 which represents the maximum acceleration in the space-time diagram. If one furthermore plots a curve which represents the minimum acceleration possible in the vehicle longitudinal direction—it also being possible for this to mean a maximum possible vehicle deceleration—then one obtains a curve in the space-time diagram according to the type of line 8. In this context, a further line 9 represents the maximum possible vehicle lateral acceleration in one direction, which, however, is calculated in the same way in the opposite vehicle lateral direction. In addition to the cases of lines 7, 8, 9 considered, all further maximum vehicle accelerations in all other directions, which are composed of a combination of longitudinal direction and transverse direction, are calculated, a trajectory tube thereby being yielded which widens ever more sharply in the direction of future points of time, thus, in the direction of rising t-values. If one intersects this spatial trajectory tube with a plane at point of time t=t1, the plane being established parallel to the xy-plane, then one obtains a line 10, closed upon itself, which delimits the maximum area attainable by the vehicle by point of time t=t1. Points within this self-closed line 10 are also attainable with vehicle longitudinal and lateral accelerations which lie below the maximum possible vehicle decelerations; points outside of self-closed line 10 are not attainable physically from the driving standpoint by vehicle 1 by point of time t=t1. Alternatively, it is also possible to use the maximum vehicle decelerations which limit the dynamic range of a comfort and convenience system. In this case, it is not a question of the maximum possible physical limits from the driving standpoint, but rather comfort limits. The same procedure may be used on all recognized objects 2; to calculate the trajectory tube, acceleration values may be assumed here which were stored on the basis of the allocated object class, or acceleration values are assumed on the basis of the measured velocity of vehicle 1 or of object 2. This is particularly advantageous when the values supplied by the vehicle surroundings sensor system do not permit determination of the possible acceleration values of object 2. A trajectory tube of this type thereby determines all points, spatial and lying in the future, which may be reached by vehicle 1 or object 2 physically from the driving standpoint, as well as all the points which are not attainable by the vehicle or the object. If one enters the trajectory tubes of vehicle 1, as well as of objects 2 detected by the vehicle surroundings sensor system, into a shared space-time diagram according to FIG. 2, one obtains a plurality of trajectory tubes whose evaluation permits the recognition of an unavoidable collision. To that end, one considers the trajectory tubes at different points of time, an arbitrary point of time t=t1 being taken out by way of example in the following. If one intersects the space-time diagram according to FIG. 2 with a plane, defined parallel to the xy-plane, at point of time t=t1, then the trajectory tubes of vehicle 1 and of objects 2 intersect the defined plane at point of time t=t1. This sectional plane is subsequently considered in FIG. 3. One can see the spatial xy-diagram, which is plotted in the longitudinal and transverse direction of the vehicle, and represents a precalculated, instantaneous survey for point of time t=t1. In this diagram, two lines 10, 11 are shown that are closed upon themselves, line 10 representing the boundary of all points attainable by vehicle 1 at point of time t=t1, and line 11 representing the boundary of all points attainable by the at least one object 2 by point of time t=t1. To determine whether a collision between the vehicle and at least one object 2 is unavoidable, it is moreover necessary to take into account the vehicle lateral extension and the object lateral extension.

Figure 3:
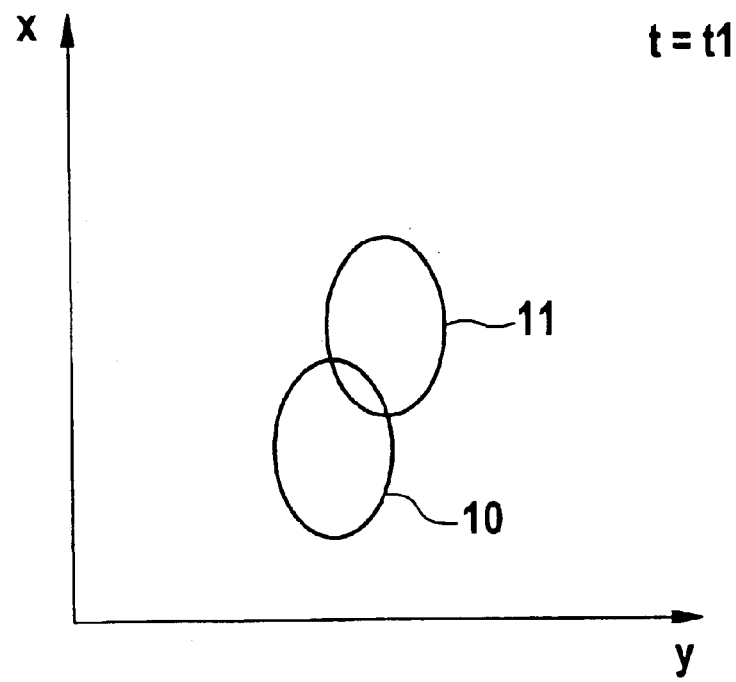
FIG. 3 shows the representation of the possible locations at a specific point of time t1.
Figure 4:
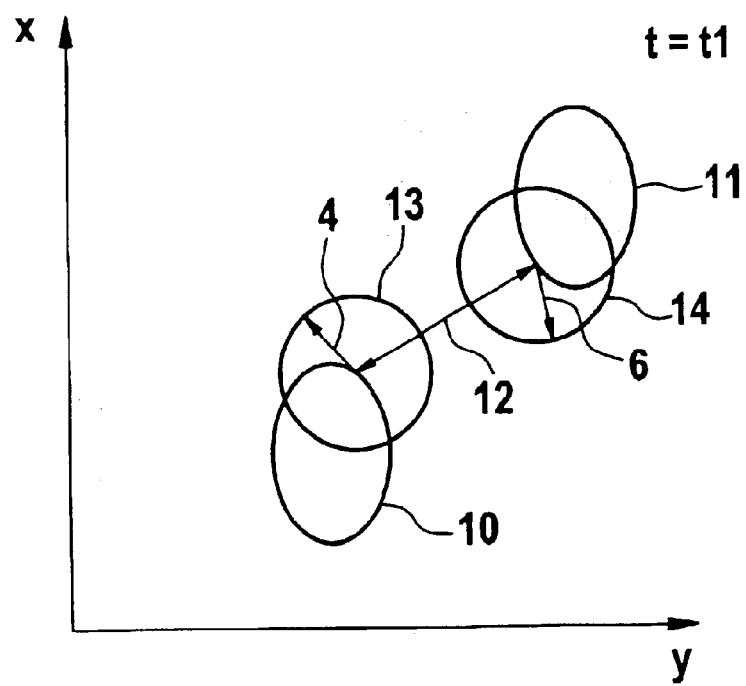
FIG. 4 shows the trajectory evaluation for the case when no collision is possible.

FIG. 4 shows the same coordinate system as explained in FIG. 3. Maximum possible vehicle location range 10, as well as maximum possible object location range 11 are also plotted in FIG. 4 for point of time t=t1. It is subsequently necessary to find the point of the boundary line of maximum possible vehicle location range 10, as well as the point of the boundary line of maximum possible object location range 11, which have the shortest distance to each other. These two points are indicated in FIG. 4 by double arrow 12. The length of double arrow 12 represents the minimally attainable distance between vehicle 1 and object 2. To take into account the vehicle lateral extension, it is necessary to describe a circle, having the radius of half the vehicle lateral extension 4, about the point of the boundary line of maximum possible vehicle location range 10 which is marked by the one end of double arrow 12. In the same way, the object lateral extension is taken into account by describing a circle, having radius 6 which corresponds to half of the object lateral extension, about the point of maximum possible object location range 11 which is marked by the other end of double arrow 12. In the case shown in FIG. 4, where circles 13 and 14 neither touch nor overlap, it may be concluded that a collision between vehicle 1 and object 2 during the time interval from t=0 to t=t1 is not possible, since no movement trajectory exists which will lead to a collision, taking into account the maximum possible vehicle and/or object dynamics. For the case when circles 13 and 14 overlap, it is possible that a collision could come about. However, in this case, it is still not possible to make an assertion about the imminence of an unavoidable collision.

Figure 5:
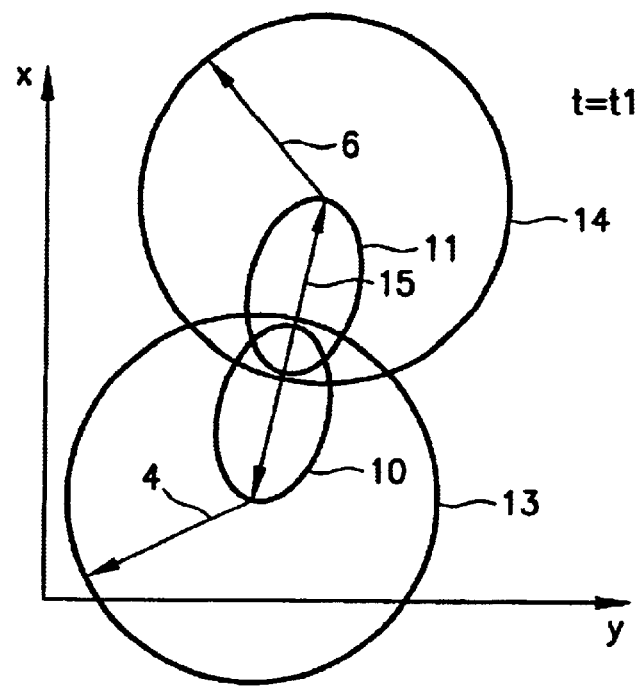
FIG. 5 shows the trajectory evaluation for the case when a collision is unavoidable.

FIG. 5 shows an xy diagram for point of time t=t1 which corresponds to the diagrams in FIGS. 3 and 4. In this diagram, maximum possible vehicle location range 10, as well as maximum possible object location range 11 are again drawn in. To determine the imminence of an unavoidable collision, it is necessary to determine the two points on lines 10 and 11 which lie the furthest from each other. These two points each represent the movement trajectories, on which vehicle 1 and object 2 are able to be the furthest away from each other at point of time t=t1. In FIG. 4, these two points are represented by the end points of double arrow 15, the length of double arrow 15 representing the maximum attainable distance between vehicle 1 and object 2. If one describes a circle 13, having the radius of half of vehicle lateral extension 4, about the end point of double arrow 15 on line 10, then it is possible to determine the range which is attainable by vehicle 1 up to point of time t=t1, and which may be covered by the vehicle extension. If one describes a circle 14, having the radius of half of object lateral extension 6, about the second end point of double arrow 15, then circle 14 describes the object extension for the case when the object is as far distant as possible from vehicle 1. If circles 13 and 14 overlap in this construction, then it is possible to predict with great probability that a collision between vehicle 1 and object 2 is unavoidable. In this case, for point of time t=t1, there is no vehicle trajectory and no object trajectory on which vehicle 1 and object 2 are able to move to avoid a collision with each other. In this event, suitable measures are triggered which are intended to lessen the unavoidable collision and/or to reduce the risk of injury to the vehicle occupants.

Figure 6:
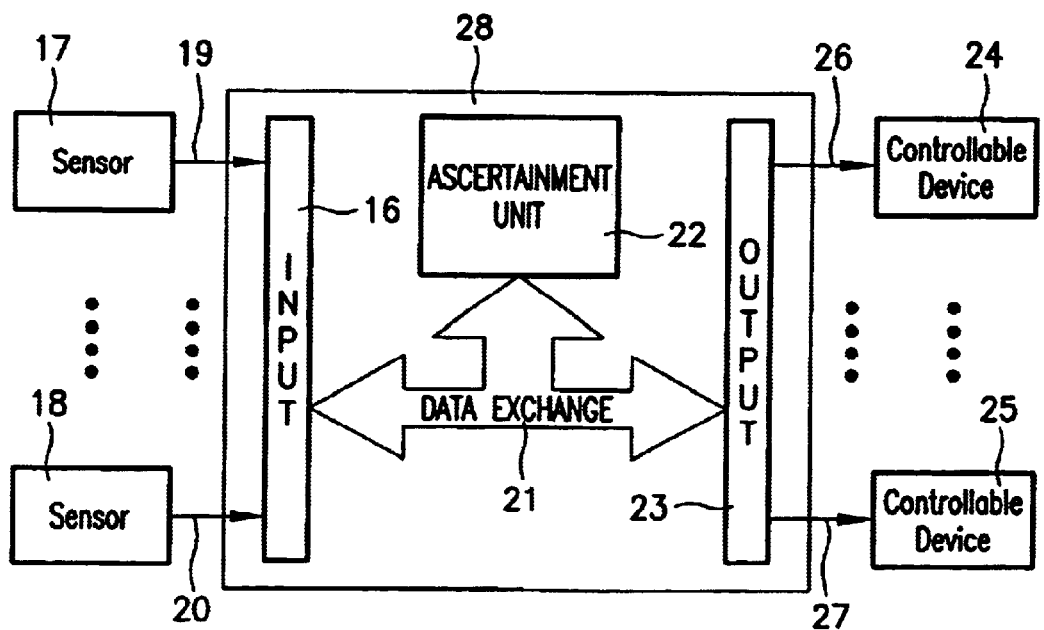
FIG. 6 shows a block diagram of the device according to the present invention.

FIG. 6 shows a device 28 for carrying out the method of the present invention. Device 28 includes an input field 16, to which signals 19 and 20 from sensor units 17 and 18 are supplied. Sensor units 17 and 18 may advantageously be radar, lidar or video sensors, which detect the vehicle surroundings at various distances and in view of different types of objects, and feed input field 16 of device 28. Device 28 also includes a data-exchange device 21 which conducts the input signals from input field 16 to ascertainment unit 22, and routes data from ascertainment unit 22 to output field 23. Data-exchange device 21 advantageously takes the form of a bus system which is known per se and may expediently be implemented as a CAN bus. In ascertainment unit 22, signals 19 and 20, supplied to device 28, are evaluated according to the method described for determining the imminence of an unavoidable collision, and a suitable output signal is generated, if indicated. The output signal thus generated is routed from ascertainment 22 via data-exchange device 21 to output field 23, and from there, in the form of output signals 26 and 27, is routed to controllable devices 24 and 25. These controllable devices 24 and 25 are advantageously at least one deceleration device and/or a steering device and/or at least one occupant restraint system, which, in response to a recognized, unavoidable collision, are triggered in such a way that the severity of the collision and/or the risk of injury to the vehicle occupants is minimized.

What is claimed is:

1. A method for ascertaining an imminence of an unavoidable collision of a vehicle with at least one object, comprising:
    predetermining, as a function of a maximum possible longitudinal acceleration and a maximum possible lateral acceleration of the vehicle and of the at least one object, all locations within a determinable prediction time interval that are attainable by the maximum possible longitudinal acceleration and the maximum lateral acceleration within the determinable prediction time interval; and
    recognizing the imminence of the unavoidable collision between the vehicle and the at least one object by taking into account extensions of the vehicle and of the at least one object.

2. The method as recited in claim 1, further comprising:
    upon recognition of the unavoidable collision, initiating a measure to at least one of reduce a severity of the collision, decrease a risk of injury to a vehicle occupant, influence the vehicle so that the risk of injury to the vehicle occupant is reduced, and warn a driver.

3. The method as recited in claim 1, further comprising:
    in order to predetermine future locations of the vehicle and of the at least one object, evaluating at least one of an instantaneous position, an instantaneous longitudinal velocity, an instantaneous lateral velocity, an orientation direction of the at least one object, and a spatial extension of the at least one object.

4. The method as recited in claim 1, further comprising:
    ascertaining, by using at least one of a radar, a lidar, and a video sensor, an instantaneous longitudinal velocity, an instantaneous lateral velocity, an orientation direction of the at least one object, and a spatial extension of the at least one object.

5. The method as recited in claim 1, wherein:
the maximum possible longitudinal acceleration and the maximum possible lateral acceleration of the at least one object are assumed as a function of an allocation of the at least one object to an object class.

6. The method as recited in claim 5, wherein:
the at least one object is allocated to the object class as a function of a detection by different sensor systems.

7. A method for ascertaining an imminence of an unavoidable collision of a vehicle with at least one object, comprising:
predetermining, as a function of a maximum possible longitudinal acceleration and a maximum possible lateral acceleration of the vehicle and of the at least one object, all locations within a determinable prediction time interval that are attainable by the maximum possible longitudinal acceleration and the maximum lateral acceleration within the determinable prediction time interval; and
recognizing the imminence of the unavoidable collision between the vehicle and the at least one object by taking into account extensions of the vehicle and of the at least one object, wherein:
the maximum possible longitudinal acceleration and the maximum possible lateral acceleration of the at least one object are assumed as a function of an allocation of the at least one object to an object class, and
the at least one object is allocated to the object class as a function of an object extension measured by one of a video sensor and a lidar sensor.

8. A method for ascertaining an imminence of an unavoidable collision of a vehicle with at least one object, comprising:
predetermining, as a function of a maximum possible longitudinal acceleration and a maximum possible lateral acceleration of the vehicle and of the at least one object, all locations within a determinable prediction time interval that are attainable by the maximum possible longitudinal acceleration and the maximum lateral acceleration within the determinable prediction time interval; and
recognizing the imminence of the unavoidable collision between the vehicle and the at least one object by taking into account extensions of the vehicle and of the at least one object, wherein:
the maximum possible longitudinal acceleration and the maximum possible lateral acceleration of the at least one object are assumed as a function of an allocation of the at least one object to an object class, and
the at least one object is allocated to the object class as a function of a gray-scale-value pattern found by a video sensor.

9. The method as recited in claim 1, wherein:
a determinable prediction time interval is variable, and
the determinable prediction time interval is changed as a function of a traffic situation.

10. The method as recited in claim 1, further comprising:
determining the imminence of the unavoidable collision when, within the determinable prediction time interval, a condition occurs where a trajectory tube of the vehicle intersects with a trajectory tube of the at least one object, and taking into account half a lateral extension of the vehicle and half a lateral extension of the at least one object, respectively, no trajectory exists any longer which describes a collision-free movement.

11. A device for ascertaining an imminence of an unavoidable collision of a vehicle with at least one object, comprising:
an input element by which the device is supplied with an input signal from at least one of a radar, a lidar, and a video sensor;
an ascertainment unit for ascertaining the imminence of the unavoidable collision with the least one object, wherein the ascertainment unit includes:
an arrangement for predetermining, as a function of a maximum possible longitudinal acceleration and a maximum possible lateral acceleration of the vehicle and of the at least one object, all locations within a determinable prediction time interval that are attainable by the maximum possible longitudinal acceleration and the maximum lateral acceleration within the determinable prediction time interval, and
an arrangement for recognizing the imminence of the unavoidable collision between the vehicle and the at least one object by taking into account extensions of the vehicle and of the at least one object; and
an output element for triggering another device by which, upon recognition of the unavoidable collision, a measure is initiated for at least one of reducing a severity of the unavoidable collision and reducing a risk of injury to a vehicle occupant.

12. The device as recited in claim 11, wherein:
the other device includes at least one of a deceleration device, a steering device, and an occupant restraint system.

* * * * *